US009426665B2

(12) United States Patent
Ge et al.

(10) Patent No.: US 9,426,665 B2
(45) Date of Patent: Aug. 23, 2016

(54) METHOD AND APPARATUS FOR QUANTIFYING THE CUSTOMER IMPACT OF CELL TOWER OUTAGES

(71) Applicants: AT&T Intellectual Property I, L.P., Atlanta, GA (US); AT&T Mobility II LLC, Atlanta, GA (US)

(72) Inventors: Zihui Ge, Madison, NJ (US); Mario Kosseifi, Roswell, GA (US); Matthew Osinski, Cranford, NJ (US); He Yan, Berkeley Heights, NJ (US); Jennifer Yates, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 272 days.

(21) Appl. No.: 14/088,279

(22) Filed: Nov. 22, 2013

(65) Prior Publication Data
US 2015/0148028 A1     May 28, 2015

(51) Int. Cl.
*H04W 24/00* (2009.01)
*H04W 16/18* (2009.01)
*H04W 24/04* (2009.01)

(52) U.S. Cl.
CPC .............. *H04W 16/18* (2013.01); *H04W 24/04* (2013.01)

(58) Field of Classification Search
CPC ..... H04W 16/08; H04W 16/18; H04W 24/04; H04W 24/08; H04W 24/02; H04W 48/20; H04W 72/04; H04W 72/1252
USPC ........................................................ 455/423
See application file for complete search history.

(56) References Cited

U.S. PATENT DOCUMENTS

| 6,222,824 | B1* | 4/2001 | Marin ................. H04L 12/5602 370/230 |
| 8,391,896 | B2 | 3/2013 | Curcio et al. |
| 8,509,762 | B2 | 8/2013 | Li et al. |
| 8,526,299 | B2 | 9/2013 | Ni et al. |
| 2010/0216453 | A1 | 8/2010 | Kallin et al. |
| 2011/0130137 | A1 | 6/2011 | Sanders et al. |
| 2012/0002537 | A1* | 1/2012 | Bao ....................... H04W 24/04 370/221 |
| 2012/0088491 | A1 | 4/2012 | Deng et al. |
| 2012/0213057 | A1 | 8/2012 | Zhang et al. |

(Continued)

OTHER PUBLICATIONS

"When Cell Towers Fail: Quantifying the Customer Impact", http://www.research.att.com/articles/featured_stories/2013_03/201306_tower-outage-analyzer.html?fbid=AlCnobPGwAP.

(Continued)

*Primary Examiner* — Thai Vu (57) ABSTRACT

A method, computer-readable storage device and apparatus for quantifying a total number of customers impacted by a cellular tower outage are disclosed. For example, the method monitors a plurality of cellular towers, detects a failure of one of the plurality of cellular towers, identifies a subset of the plurality of cellular towers that are included in an affected region, calculates a number of additional customers served by each one of the subset of the plurality of cellular towers that are included in the affected region due to the failure of the one cellular tower, and quantifies the total number of customers impacted by the failure of the one cellular tower by adding the number of additional customers served by the each one of the subset of the plurality of cellular towers that are included in the affected region.

18 Claims, 4 Drawing Sheets

(56) References Cited

U.S. PATENT DOCUMENTS

| | | | |
|---|---|---|---|
| 2012/0244864 A1* | 9/2012 | Fujii | H04W 36/0066 455/436 |
| 2012/0307697 A1 | 12/2012 | Mukhopadhyay | |
| 2013/0005385 A1 | 1/2013 | Hunukumbure et al. | |
| 2013/0051239 A1 | 2/2013 | Meredith et al. | |
| 2013/0053024 A1 | 2/2013 | Zou et al. | |

OTHER PUBLICATIONS

Traynor, Patrick, et al. "On cellular botnets: measuring the impact of malicious devices on a cellular network core." *Proceedings of the 16th ACM conference on Computer and communications security.* ACM, 2009.

\* cited by examiner

METHOD AND APPARATUS FOR QUANTIFYING THE CUSTOMER IMPACT OF CELL TOWER OUTAGES

BACKGROUND

With the world increasingly dependent on mobile communications, any interruption to mobile services will negatively impact users and businesses. So when cell towers fail, whether it is a single tower failing or a cluster of towers failing simultaneously, network providers work tirelessly to quickly restore service to minimize the impact on customers.

Currently, customer impact due to failed cellular towers are performed manually by an operator based upon the operator's understanding of the nature of the outage, its root cause and expected impact and the user or usage estimates. Failures are also often analyzed on a per incident basis with each outage examined in isolation and the fault-tolerance mechanisms ignored, simply due to the complexity of performing such analysis in a manual fashion. Consequently, the impact analysis result may be quite inaccurate, for example, when the operator misjudges the failure scenario or under or over estimates the user population.

SUMMARY

In one embodiment, the present disclosure provides a method for monitoring a plurality of cellular towers, detecting a failure of one of the plurality of cellular towers, identifying a subset of the plurality of cellular towers that are included in an affected region, calculating a number of additional customers served by each one of the subset of the plurality of cellular towers that are included in the affected region due to the failure of the one cellular tower, and quantifying the total number of customers impacted by the failure of the one cellular tower by adding the number of additional customers served by the each one of the subset of the plurality of cellular towers that are included in the affected region.

BRIEF DESCRIPTION OF THE DRAWINGS

The essence of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure relates generally to analysis of network operations and, more particularly, to a method and apparatus for quantifying the customer impact of cell tower outages. As discussed above, customer impact due to failed cellular towers are performed manually by an operator based upon the operator's understanding of the nature of the outage, its root cause and expected impact and the user or usage estimates. Failures are also often analyzed on a per incident basis with each outage examined in isolation and the fault-tolerance mechanisms ignored, simply due to the complexity of performing such an analysis manually. Consequently, the impact analysis result may be quite inaccurate, for example, when the operator misjudges the failure scenario or under or over estimates the user population.

One embodiment of the present disclosure provides an objective and automated method to quantifying a total number of customers impacted by a cellular tower outage and measuring the effect of the cellular tower outage on performance of the remaining cellular towers in an affected region. In one embodiment, the present disclosure may also automatically identify which cellular towers are included in the affected region based upon an analysis of each cellular tower within a predefined radius.

Figure 1:
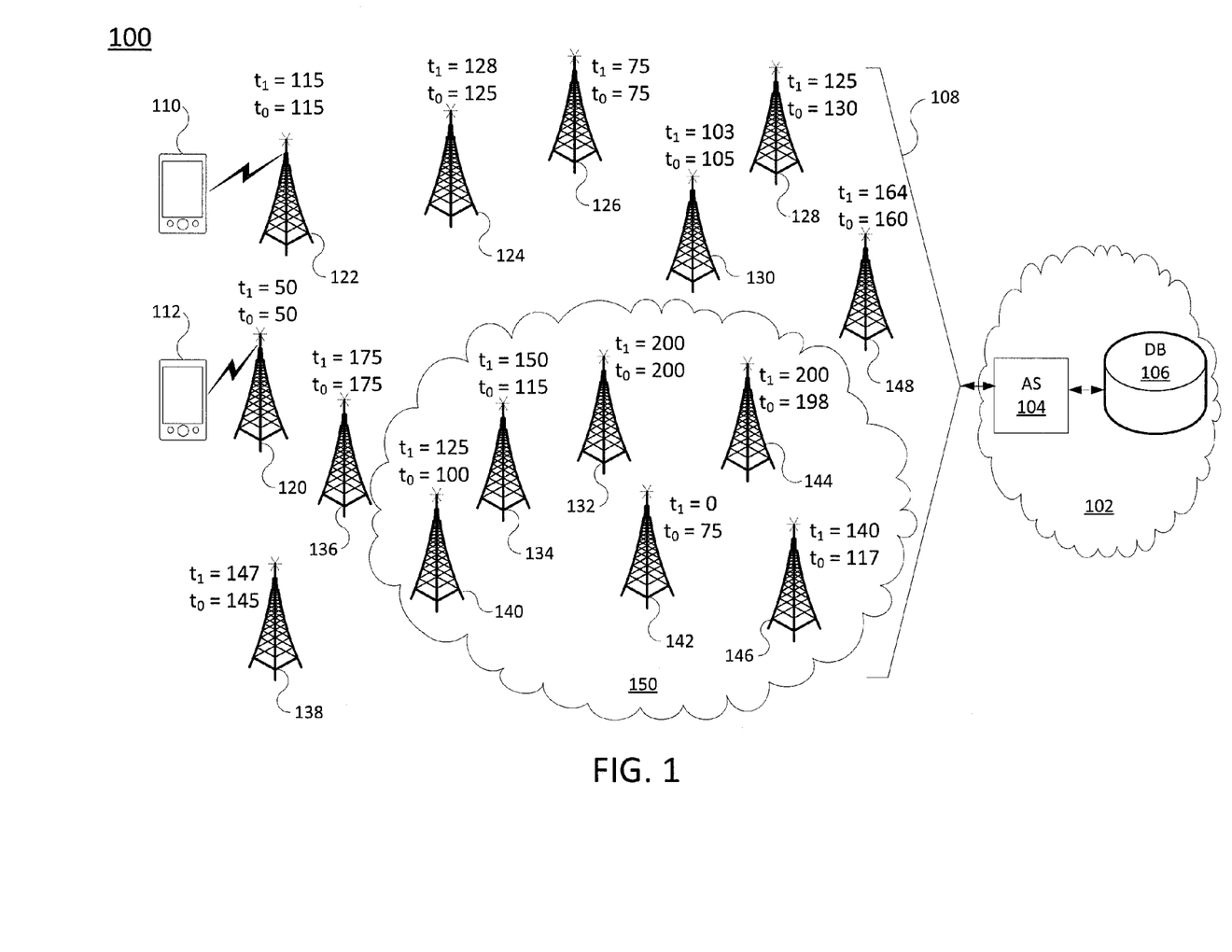
FIG. 1 illustrates one example of a communications network of the present disclosure.

FIG. 1 is a block diagram depicting one example of a communications network 100. For example, the communication network 100 may be any type of communications network, such as for example, a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, and the like related to the current disclosure. It should be noted that an IP network is broadly defined as a network that uses Internet Protocol to exchange data packets.

Figure 4:
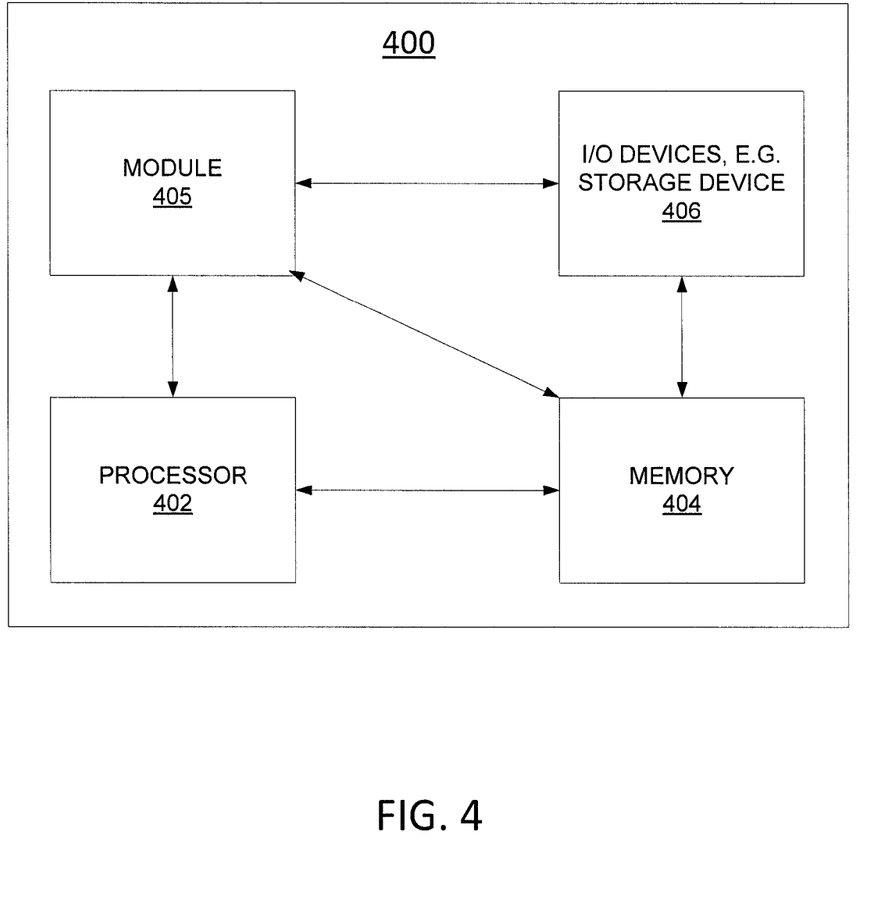
FIG. 4 illustrates a high-level block diagram of a general-purpose computer suitable for use in performing the functions described herein.

In one embodiment, the communications network 100 may include a core network 102. The core network 102 may include an application server (AS) 104. The AS 104 may be deployed as a computer server or general purpose computer as illustrated in FIG. 4 and discussed below. In one embodiment, the AS 104 may be used to perform analysis on data collected over a period of time from each one of the cellular towers 120-146 to identify which cellular towers should be included in an affected region 150, quantify a total number of customers affected by a cellular tower failure or outage and measure data related to one or more performance parameters of the cellular towers in the affected region 150 during the cellular tower failure.

The core network 102 may also include a database (DB) 106 in communication with the AS 104. The DB 106 may store the data collected over the period of time of each one of the cellular towers 120-146, the various algorithms and equations used by the AS 104 to perform the analysis, the measured performance parameters of the cellular towers in the affected region 150 during the cellular tower failure, and the like.

In one embodiment, the AS 104 may be in communication with the cellular towers 120-146 via access networks (not shown). In one embodiment, the cellular towers 120-146 may be a cellular antenna, a cellular access point, and the like. Although 17 cellular towers are illustrated in FIG. 1, it should be noted that any number of cellular towers 120-146 (e.g., more or less) may be deployed.

In one embodiment, one or more endpoint devices 110 and 112 may be in communication with one or more of the cellular towers 120-146 to receive cellular communication services (e.g., voice, data, multimedia content, messaging, and the like). In one embodiment, the endpoint devices 110 and 112 may be any type of endpoint device that uses wireless or cellular communications, such as for example, a cell phone, a smart phone, a laptop computer, a tablet computer, a netbook computer, a mobile hotspot device, and the like. Although only two endpoint devices 110 and 112 are illustrated in FIG. 1, it should be noted that any number of endpoint devices may be deployed.

In one embodiment, the communications network 100 may include additional access networks that are not shown. For example, the communications network 100 may include one or more access networks such as a cellular network, a Wi-Fi network, and the like. In one embodiment, the communications network 100 may also include additional network elements not shown to simplify the network illustrated in FIG. 1, such as for example, border elements, gateways, routers, switches, call control elements, various application servers, and the like.

As discussed above, the AS 104 may be used to perform analysis on data collected over a period of time from each one of the cellular towers 120-146 to identify which cellular towers should be included in an affected region 150, quantify a total number of customers affected by a cellular tower failure or outage and measure data related to one or more performance parameters of the cellular towers in the affected region 150 during the cellular tower failure.

To illustrate an example, each one of the cellular towers 120-146 includes two data points at $t_0$ and $t_1$. At time $t_0$ FIG. 1 illustrates a number of customers served by each one of the cellular towers 120-146. FIG. 1 also illustrates a number of customers served by each one of the cellular towers 120-146 at a later time $t_1$.

In one embodiment, the AS 104 may monitor the cellular towers 120-146. Notably, at time $t_1$ the cellular tower 142 fails or experiences an outage and the number of customers serviced by the cellular tower 142 changes from 75 to 0. Consequently, the failure of the cellular tower 142 will have an effect on one or more other cellular towers. In one embodiment, the failure may be detected automatically by detecting the drop in customers being serviced from 75 to zero. In another embodiment, an error message or signal may be sent from the cellular tower 142 to the AS 104 indicating that the cellular tower 142 has failed.

In one embodiment of the present disclosure, the AS 104 may identify which one of the cellular towers 120-146 should be included in the affected region 150 by analyzing each one of the cellular towers 120-146 within a predefined area, region or radius. For example, the AS 104 may analyze each cellular tower within a 10 mile radius, a 20 mile radius, within a geographic boundary of a city, and the like.

In one embodiment, the AS 104 may identify a subset of the cellular towers 120-146 that should be included in the affected region 150 by determining the cellular towers that have a statistically significant change in the number of customers that is served and those that are at or near a maximum capacity using a diffusion analysis.

In the example illustrated in FIG. 1, the cellular towers 134, 140 and 146 may be considered to have a statistically significant change and included in the affected region 150 that contains at least one failed cellular tower. In one embodiment, the statistically significant change in the number of customers that are served may be calculated by analyzing observation data collected over a period of time of each one of the cellular towers 120-146 within the predefined area. For example, the observation data may include a number of customers served by each cellular tower 120-146 over the last year, last month, last week, last day and the like. The analysis may be performed because the cellular towers that have a statistically significant change in the number of customers served may not always be the cellular towers that are closest to the cellular tower that has failed.

Figure 2:
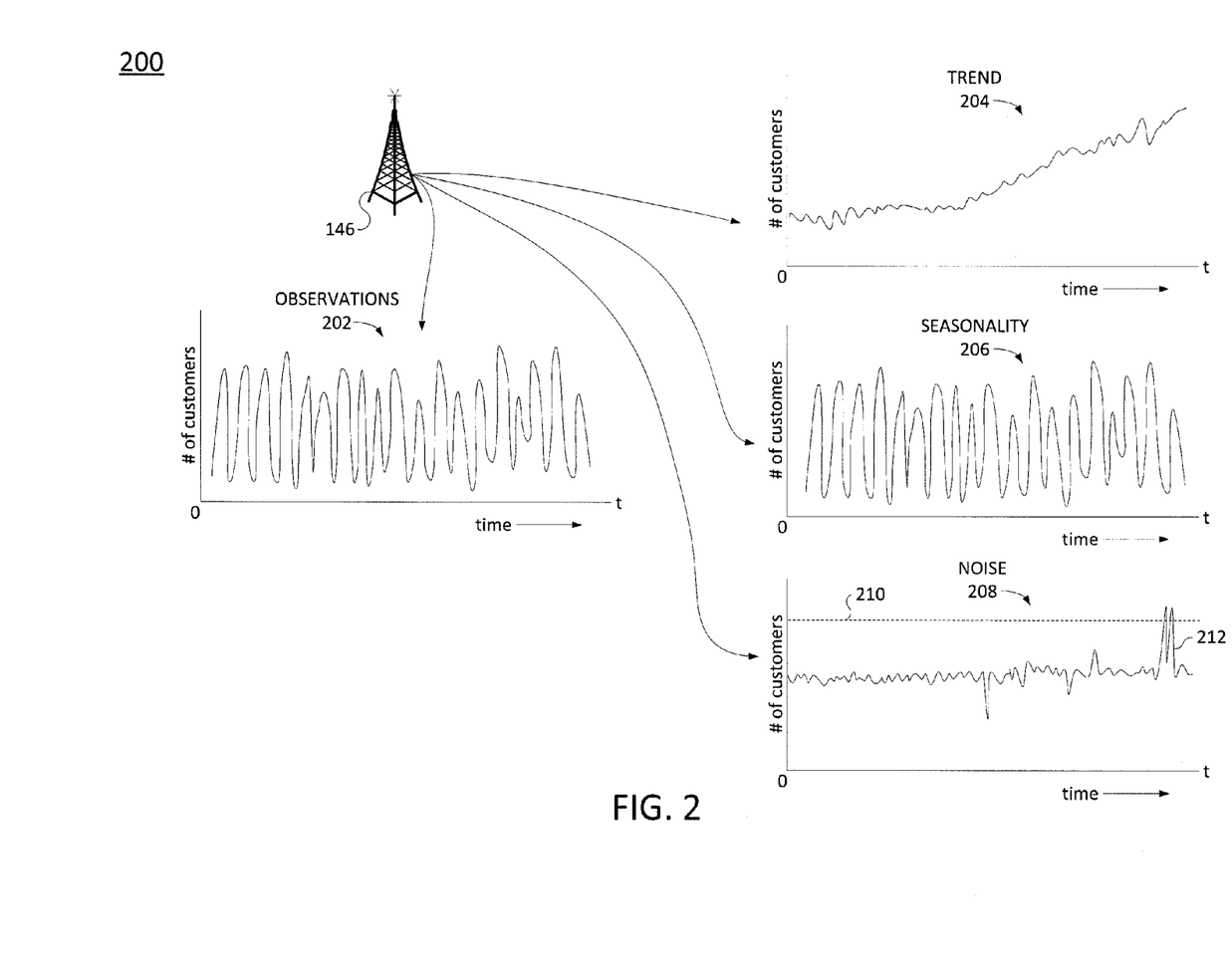
FIG. 2 illustrates a graphical representation of identifying a noise component.

FIG. 2 illustrates an example of an observation component 202 of the cellular tower 146. The observation component 202 may be a plot or graph of the number of customers from 0 to n served by the cellular tower 146 over a time period t in desired or predefined increments of t (e.g., each month, each week, each day, each hour, and the like). The observation component 202 may be decomposed by removing a trend component 204 and a seasonality component 206 to obtain a noise component 208. Each of the trend component 204, the seasonality component 206 and the noise component 208 may also be a graph of a number of customers from 0 to n served by the cellular tower 146 over a time period t in desired increments.

Said another way, a time series decomposition may be applied, which is a light-weight offline time series analysis algorithm. In one embodiment, the time series decomposition may be applied for analyzing a long range of historical data for each one of the cellular towers 120-146 or in a moving window fashion for recent data (e.g., as new data is appended to the time series).

In one embodiment, the trend component 204 may be calculated by a centered moving average. Given the original component 202 time series V, a specified seasonality window W, a trend T may be obtained through smoothing over long term (multiples of W) for time t by Equation (1) below:

$$T_t = \Sigma_{i=-W}^{W-1} V_{t+1}/2W, \text{for } i=-W \text{ to } W-1 \qquad \text{Equation (1)}$$

In one embodiment, the seasonal component 206 may be calculated by averaging a phase value (after removing the trend component 204) across seasons, e.g., by season moving average, for a time t given by Equation (2) below:

$$S_t = \Sigma_{i=0}^{K} V_{t-iw} - T_{t-iw}, \text{for } i=0 \text{ to } K, \qquad \text{Equation (2)}$$

where K is the number of seasonal windows contained in the historical data. For example, each seasonal window could be based upon the dates for each season such as, for example, spring, summer, autumn and winter.

In one embodiment, the noise component 208, or noise N for a time t, may be the remainder given by the Equation (3) below:

$$N_t = V_t - T_t - S_t \qquad \text{Equation (3)}$$

In one embodiment, the cellular tower 146 may be considered to have a statistically significant change in a number of customers that is served if noise component at a time $t_1$ is above a threshold 210. In one embodiment, the threshold 210 may be based upon a sigma analysis and be set at 3 sigmas. However, the threshold 210 may be set at any threshold that is considered to be statistically significant for a variety of different statistical analysis.

As illustrated in the noise component 208 in FIG. 2, the cellular tower 146 has a noise component peak 212 that breaches the threshold 210. As a result, the cellular tower 146 is identified as having a statistically significant change in the number of customers that is served and included in the affected region 150 in FIG. 1.

In one embodiment, the time series decomposition may be performed on each one of the cellular towers 120-146 that is to be analyzed within the predefined area. In one embodiment, if there is no change in the number of customers served by a cellular tower, it may be assumed that there no statistically significant change and the time series decomposition analysis may not be performed on the cellular tower (e.g., cellular towers 120, 122, 126, 128 and 136).

In one embodiment, the noise component 208 may be modeled at different phases as zero-mean Gaussian variables with different variance $\sigma_{t|W}^2$, where the phase t|W represents t mod W. The corresponding time series value, $V_t$, can be tagged as anomalous (e.g., critical value 1.96 at a 95% confidence interval) if $|N_t/\sigma_{t|W}^2| > 1.96$. This may be used for anomaly detection. An iterative process may also be used to remove the anomalous points in the previous iteration from a trend and noise variance computation to provide a robust approach when applied to bad data or data that includes bad anomalies.

Referring back to FIG. 1, the cellular towers 132 and 144 may be considered to be near a maximum capacity and included in the affected region 150. For example, the maximum capacity may be 200 customers and the cellular tower 132 may not have a statistically significant change in the number of customers that is served. However, this may be due to the fact that the cellular towers 132 and 144 were at or near the maximum capacity of 200 customers already at $t_0$. Thus, the failure of the cellular tower 142 may add an additional strain on the cellular towers 132 and 144 since they are at or near maximum capacity.

In one embodiment, a diffusion algorithm may be used to identify the cellular towers (e.g., the cellular towers 132 and 144) that are at or near maximum capacity that should also be included in the affected region 150. In one embodiment, the diffusion algorithm may be as follows: A heat source vector $S_i$ for each tower i is defined. $S_i=1$ if and only if tower i is under outage or its number of endpoint devices 110 and 112 significantly deviates from expectation. A 2D Gaussian kernel function with a width parameter $$\sigma = \frac{5}{1.96}$$

may be adopted so that two towers 5 miles apart may have a negligible impact on one another. Then the energy conserving diffusion transition matrix (with a cut-off of 5 miles) may be defined by Equation (4) below:

$$A[i, j] = \frac{f(d(i, j))}{\sum_{j\ within\ 5\ miles\ from\ i} f(d(i, j))}, \quad \text{Equation (4)}$$

where d(i, j) is a Euclidean distance between towers i and j, and f( ) is a diffusion kernel function. The detailed diffusion process may be given by Algorithm 1 below:

Diffusion Algorithm 1

---
Let $H_o$ denote the source heat vector.
Let A denote the transition matrix.
Let $\epsilon$ denote the convergence threshold.
Let $\alpha$ denote the reinforcement parameter.
H = $H_o$
$H_1 = H_o + \epsilon$
while sum($|H_1 - H|$) ≥ $\epsilon$ do
   $H_1$ = H
   H = H x A
   H = $\alpha$(H·H)sum($H_o$)/sum(H·H) + (1 − $\alpha$) $H_o$
   H(find(H > 1)) = 1
end while.

---

In one embodiment, it should be noted that the Algorithm 1 captures both the distance information between towers and the tower density information within the predefined area. The parameters in the Algorithm 1 may be set as the following: convergence threshold $\epsilon = 10^{-3}$ and reinforcement parameter $\alpha = 0.5$.

Once the affected region 150 is defined to include the subset of cellular towers 132, 134, 140, 144 and 146, the AS 104 may then quantify a total number of customers impacted by a cellular tower outage by adding the number of additional customers served by each one of the subset of the cellular towers 132, 134, 140, 144 and 146 that are included in the affected region 150. Using the above example, the cellular tower 134 serves an additional 35 customers, the cellular tower 140 serves an additional 25 customers, the cellular tower 144 serves an additional 2 customers and the cellular tower 146 serves an additional 23 customers. As a result, the AS 104 may quantify the total number of customers impacted by the outage of the cellular tower 142 as 85.

It should be noted that the numbers are provided only as examples in FIG. 1 and should not be considered as a limitation of the present disclosure. That is, the time-series decomposition and the diffusion algorithm may be applied irrespective of the number of customers served by each one of the cellular towers 120-146 and the change in the number of customers served by each one of the cellular towers 120-146.

In one embodiment, the AS 104 may also measure a performance parameter of the affected region 150. Thus, the AS 104 may provide concrete data as to how the affected region 150 is performing after the cellular tower 142 fails. The performance measurements may also be provided to compare the performance of the affected region 150 to before and after the cellular tower 142 failed. Examples of performance parameters that may be measured and reported for the affected region 150 may include a radio resource control (RRC) connection setup success rate for data and voice calls, a radio access bearer (RAB) assignment success rate for data and voice calls, a retainability rate for data and voice calls, a dropped call rate for data and voice calls, a radio link layer throughput, a medium access control layer throughput, and the like.

Thus, one embodiment of the present disclosure allows the AS 104 to provide an objective analysis to detect when a cellular tower fails or has an outage, identify which subset of the cellular towers should be included in an affected region, quantify a total number of customers impacted by the outage of the cellular tower and measure one or more performance parameters of the affected region. As a result, the present disclosure provides an improvement over the manual and subjective analysis that was previously performed when a cellular tower failed or experienced an outage.

Figure 3:
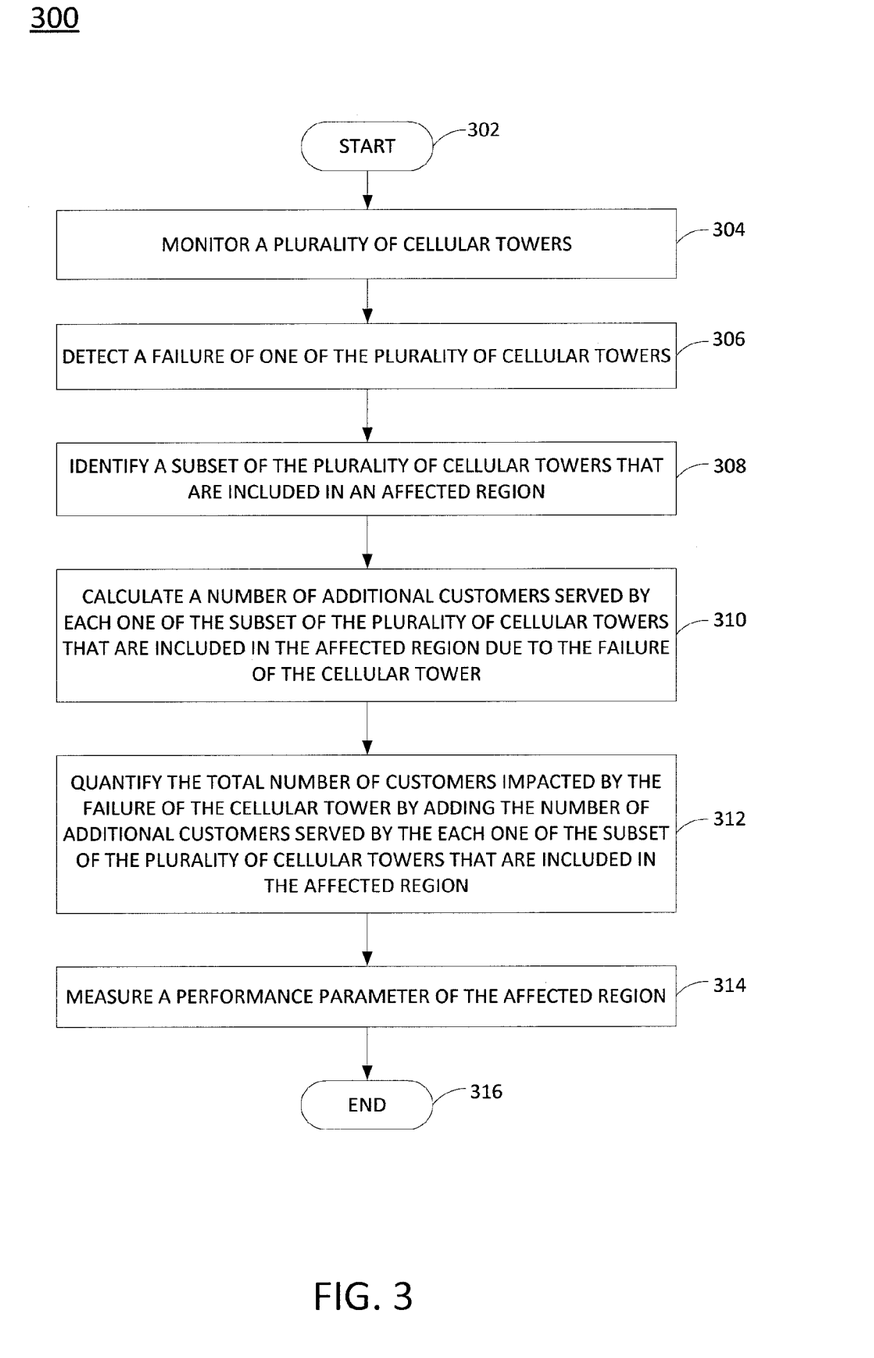
FIG. 3 illustrates an example flowchart of a method for quantifying a total number of customers impacted by a cellular tower outage.

FIG. 3 illustrates a flowchart of a method 300 for quantifying a total number of customers impacted by a cellular tower outage. In one embodiment, the method 300 may be performed by the AS 104 or a general purpose computer as illustrated in FIG. 4 and discussed below.

The method 300 begins at step 302. At step 304, the method 300 monitors a plurality of cellular towers. For example, a plurality of cellular towers may be monitored to track a number of customers that is being served or listen for error messages sent by one of the plurality of cellular towers.

At step 306, the method 300 detects a failure of one of the plurality of cellular towers. For example, one of the plurality of cellular towers that is being monitored may have a number of customers that is being served suddenly drop to 0 from some positive number. In another embodiment, an error signal may be received informing that a cellular tower has failed or is experiencing an outage.

At step 308, the method 300 identifies a subset of the plurality of cellular towers that are included in an affected region. In one embodiment, the subset of the plurality of cellular towers that are included in the affected region may be based upon a statistically significant change in the number of customers served by a cellular tower and the cellular towers that are at or near a maximum capacity. In one embodiment, each one of the cellular towers within a predefined area or radius (e.g., 1 mile, 10 miles, 100 miles, and the like) may be analyzed.

In one embodiment, a statistically significant change may be determined by analyzing a noise component of an observation component that is obtained by decomposing the observation component into a trend component, a seasonality component and the noise component. In one embodiment, a time series decomposition may be used as described above with reference to FIG. 2 and using Equations (1)-(3) described above.

In one embodiment, a diffusion algorithm may be applied to the cellular towers to identify those cellular towers that are at or near a maximum capacity that should be included in the affected region. A combination of the Equation (4) and the Algorithm 1 described above may be applied.

At step 310, the method 300 calculates a number of additional customers served by each one of the subset of the plurality of cellular towers that are included in the affected region due to the failure of the cellular tower. For example, once the subset of the plurality of cellular towers that are included in the affected region is identified, the change in the number of additional customers served by each one of the subset of the plurality of cellular towers may be calculated. For example, the additional number of customers may be a number of customers being served at a present time minus a number of customers that was being served at a previous time.

At step 312, the method 300 quantifies the total number of customers impacted by the failure of the cellular tower by adding the number of additional customers served by each one of the subset of the plurality of cellular towers that are included in the affected region. For example, the method 300 may sum the calculation performed in step 310 for each one of the subset of the plurality of cellular towers in the affected region to obtain a total number of customers.

At step 314, the method 300 may also measure a performance parameter of the affected region. For example, the performance measurements may also be provided to compare the performance of the affected region 150 to before and after the cellular tower 142 failed. Examples of performance parameters that may be measured and reported for the affected region 150 may include a radio resource control (RRC) connection setup success rate for data and voice calls, a radio access bearer (RAB) assignment success rate for data and voice calls, a retainability rate for data and voice calls, a dropped call rate for data and voice calls, a radio link layer throughput, a medium access control layer throughput, and the like. The method 300 ends at step 316.

It should be noted that although not explicitly specified, one or more steps of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, operations or blocks in FIG. 3 that recite a determining operation, or involve a decision, do not necessarily require that both branches of the determining operation be practiced. In other words, one of the branches of the determining operation can be deemed as an optional step.

FIG. 4 depicts a high-level block diagram of a general-purpose computer suitable for use in performing the functions described herein. As depicted in FIG. 4, the system 400 comprises a hardware processor element 402 (e.g., a central processing unit (CPU), a microprocessor, or a multi-core processor), a memory 404, e.g., random access memory (RAM) and/or read only memory (ROM), a module 405 for quantifying a total number of customers impacted by a cellular tower outage, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed manner for a particular illustrative example, i.e., the steps of the above method(s) or the entire method(s) are implemented across multiple general-purpose computers, then the general-purpose computer of this figure is intended to represent each of those multiple general-purpose computers.

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 405 for quantifying a total number of customers impacted by a cellular tower outage (e.g., a software program comprising computer-executable instructions) can be loaded into memory 404 and executed by hardware processor element 402 to implement the steps, functions or operations as discussed above in connection with the exemplary method 300. The processor executing the computer readable or software instructions relating to the above described method(s) can be perceived as a programmed processor or a specialized processor. As such, the present module 405 for quantifying a total number of customers impacted by a cellular tower outage (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for quantifying a total number of customers impacted by a cellular tower outage, the method comprising:
    monitoring, by a processor, a plurality of cellular towers;
    detecting, by the processor, a failure of one of the plurality of cellular towers;
    identifying, by the processor, a subset of the plurality of cellular towers that are included in an affected region, wherein the subset of the plurality of cellular towers comprises a cellular tower having a statistically significant change in a number of customers that is served by the cellular tower, wherein the statistically significant change comprises:
obtaining, by the processor, an observation of a number of customers over a period of time;
identifying, by the processor, a noise component of the observation of the number of customers over the period of time by removing a seasonal trend from the observation of the number of customers over the period of time; and
determining, by the processor, that the noise component is above a threshold;
calculating, by the processor, a number of additional customers served by each one of the subset of the plurality of cellular towers that are included in the affected region due to the failure of the one cellular tower; and
quantifying, by the processor, the total number of customers impacted by the failure of the one cellular tower by adding the number of additional customers served by the each one of the subset of the plurality of cellular towers that are included in the affected region.

2. The method of claim 1, further comprising:
measuring, by the processor, a performance parameter of the affected region.

3. The method of claim 1, wherein the identifying is performed within a pre-defined region.

4. The method of claim 1, wherein the threshold comprises three sigmas.

5. The method of claim 1, wherein the subset of the plurality of cellular towers that is included comprises a cellular tower that is at a maximum capacity.

6. The method of claim 5, wherein the cellular tower that is at the maximum capacity is identified by a diffusion algorithm.

7. A computer-readable storage device storing a plurality of instructions, which when executed by a processor, cause the processor to perform operations for quantifying a total number of customers impacted by a cellular tower outage, the operations comprising:
monitoring a plurality of cellular towers;
detecting a failure of one of the plurality of cellular towers;
identifying a subset of the plurality of cellular towers that are included in an affected region, wherein the subset of the plurality of cellular towers comprises a cellular tower having a statistically significant change in a number of customers that is served by the cellular tower, wherein the statistically significant change comprises:
obtaining an observation of a number of customers over a period of time;
identifying a noise component of the observation of the number of customers over the period of time by removing a seasonal trend from the observation of the number of customers over the period of time; and
determining that the noise component is above a threshold;
calculating a number of additional customers served by each one of the subset of the plurality of cellular towers that are included in the affected region due to the failure of the one cellular tower; and
quantifying the total number of customers impacted by the failure of the one cellular tower by adding the number of additional customers served by the each one of the subset of the plurality of cellular towers that are included in the affected region.

8. The computer-readable storage device of claim 7, further comprising:
measuring a performance parameter of the affected region.

9. The computer-readable storage device of claim 7, wherein the identifying is performed within a pre-defined region.

10. The computer-readable storage device of claim 7, wherein the threshold comprises three sigmas.

11. The computer-readable storage device of claim 7, wherein the subset of the plurality of cellular towers that is included comprises a cellular tower that is at a maximum capacity.

12. The computer-readable storage device of claim 11, wherein the cellular tower that is at the maximum capacity is identified by a diffusion algorithm.

13. An apparatus for quantifying a total number of customers impacted by a cellular tower outage, the apparatus comprising:
a processor; and
a computer-readable storage device storing a plurality of instructions which, when executed by the processor, cause the processor to perform operations, the operations comprising:
monitoring a plurality of cellular towers;
detecting a failure of one of the plurality of cellular towers;
identifying a subset of the plurality of cellular towers that are included in an affected region, wherein the subset of the plurality of cellular towers comprises a cellular tower having a statistically significant change in a number of customers that is served by the cellular tower, wherein the statistically significant change comprises:
obtaining an observation of a number of customers over a period of time;
identifying a noise component of the observation of the number of customers over the period of time by removing a seasonal trend from the observation of the number of customers over the period of time; and
determining that the noise component is above a threshold;
calculating a number of additional customers served by each one of the subset of the plurality of cellular towers that are included in the affected region due to the failure of the one cellular tower; and
quantifying the total number of customers impacted by the failure of the one cellular tower by adding the number of additional customers served by the each one of the subset of the plurality of cellular towers that are included in the affected region.

14. The apparatus of claim 13, the operations further comprising:
measuring a performance parameter of the affected region.

15. The apparatus of claim 13, wherein the identifying is performed within a pre-defined region.

16. The apparatus of claim 13, wherein the threshold comprises three sigmas.

17. The apparatus of claim 13, wherein the subset of the plurality of cellular towers that is included comprises a cellular tower that is at a maximum capacity.

18. The apparatus of claim 17, wherein the cellular tower that is at the maximum capacity is identified by a diffusion algorithm.

* * * * *